United States Patent [19]
Karlsson

[11] Patent Number: 5,190,655
[45] Date of Patent: Mar. 2, 1993

[54] WATER PURIFICATION PROCESS 2

[76] Inventor: Johan Lars I. Karlsson, Barkstigen 4, Lidingö, Sweden

[21] Appl. No.: 769,321

[22] Filed: Sep. 26, 1991

Related U.S. Application Data

[63] Continuation of Ser. No. 462,226, Jan. 9, 1990, abandoned.

[30] Foreign Application Priority Data

Jan. 11, 1989 [SE] Sweden .............................. 8900071

[51] Int. Cl.⁵ ................................................ C02F 3/30
[52] U.S. Cl. .................................... 210/607; 210/610; 210/631; 210/903
[58] Field of Search ............... 210/605, 610, 611, 612, 210/630, 631, 613, 903, 607, 625, 906

[56] References Cited
U.S. PATENT DOCUMENTS

| | | | |
|---|---|---|---|
| 3,617,540 | 11/1971 | Bishop et al. | 210/903 X |
| 3,846,293 | 11/1974 | Campbell | 210/903 X |
| 4,240,904 | 12/1980 | Dassen | 210/613 X |
| 4,488,967 | 12/1984 | Block et al. | 210/605 |
| 4,787,978 | 11/1988 | Nicol | 210/605 |

*Primary Examiner*—Thomas Wyse
*Attorney, Agent, or Firm*—Brumbaugh, Graves, Donohue & Raymond

[57] ABSTRACT

The present invention relates to a process at the purification of water, in particular sewage water, comprising a nitrification process and a denitrification process during simultaneous decomposition of a pre-precipitated sludge of sewage water. The invention is characterized in that decomposed sludge or solutions of sludge of a chemical pre-precipitation of sewage water is added as a source of carbon at the denitrification step.

7 Claims, No Drawings

WATER PURIFICATION PROCESS 2

This application is a continuation of application Ser. No. 07/462,226, filed on Jan. 9, 1990, abandoned.

The present invention relates to a process for the purification of water, in particular sewage water for the elimination of nitrogen comprising a nitrification and a denitrification step while simultaneously decomposing organic sludge removed from the sewage water.

The object of the present invention is to provide a water purification process of the above given kind, where the denitrification step is made more efficient by organic matter present in the sewage water.

In chemical precipitation of sewage water using metal salts about 75% of the organic matter calculated as biological oxygen demanding matter (BOD) or chemical oxygen demanding matter (COD) can be removed. By using precipitation only, most often only about 30% of the organic matter is removed. The reason is that when using precipitation, only particles having a size of above 100 $\mu$m are removed. If chemical precipitation is introduced particles down to 0.1 $\mu$m can be removed. Organic matter being represented by particles of less than 0.1 $\mu$m and dissolved organic is influenced to a very little extent.

Subsequent to a precipitation step a biological purification step follows. If chemical precipitation is introduced the biological purification step is considerably discharged from organic matter. This discharge lowers the oxygen demand, but will also increase the possibilities to run the plant with oxidation of the nitrogen from ammonium to nitrate.

If a reduction of nitrate nitrogen should be desirable, this can be made biologically in a so called anoxic zone. This can be made in accordance with three main principles as pre-denitrification, as after-denitrification, or as simultaneous denitrification (incl. on-off-process).

A process of the kind given in the preamble is described in SE-B-8504289-3. This process comprises a chemical pre-precipitation using three and/or polyvalent metal salt for the pre-reduction of ingoing impurities, primarily of organic type. Then a biological purification using two processes is proposed. One of the process steps is nitrification, whereby ingoing ammonium nitrogen is being oxidized to nitrate. The second is denitrification, whereby nitrates are reduced to nitrogen gas using easily decomposable organic matter as a necessary source of carbon. Nitrogen gas can then be blown of to the atmosphere.

The two biological steps, the aerobic, and the anoxic one, are thereby carried out in any order as pre- or after-denitrification. Even a combination of these processes can be used as well as discontinous processes.

If an after-denitrification is used the micro-organisms are subject to anoxic conditions after the nitrification step, i.e., no aeration is made in this zone. The bacteria use nitrate which is reduced to nitrogen gas, as an electron acceptor in stead of oxygen. However, there has to be an electron donor (BOD or COD) present. All BOD is, however, consumed in the previous aeration step. To use an external BOD source will cost too much, and thus the original BOD contents of the sewage water is very interesting.

At conventional separation using precipitation about 30% of the organic matter is obtained in the pre-precipitation basin.

The primary sludge will then consist of particles down to a size of 0.1 mm. This sludge has a very slow availability to bacterial oxidation, even if the total BOD-values can be considerable. The reason therefore is that the particular material first has to be decomposed in an enzymatic process in order to finally be able to penetrate a bacterial cell membrane. Moreover, most often the precipitated organic part is insufficient to obtain a far reaching reduction of nitrogen.

With the object of making the denitrification step more efficient, the invention is characterized by the steps evident from the accompanying claims. Thus sludge or solutions of sludge of a chemical pre-precipitation of sewage water are used as a source of carbon in the denitrification step after a treatment step where the organic matter is converted to a biologically easily decomposable form provided that pre-precipitation has been carried out using salts of aluminium, calcium, or iron or combinations of such.

This step can comprise biological aerobic, anaerobic, enzymatic hydrolysis in combination with thermal chemical and mechanical decomposition. The organic contents of a sewage water can mainly be divided into proteins, carbohydrates, and fats. The major part is represented by fats, about half calculated as COD. An anaerobic hydrolysis of fats takes place very slowly in comparison to the hydrolysis of carbohydrates and proteins. In a simultaneous hydrolysis there is a great risk that the most easily hydrolysable products are lost in the form of methane gas and carbon dioxide. The fats can be treated chemically prior to or after a biological hydrolysis.

Preferably the sludge is treated with a combination of thermal decomposition at a temperature of 100°-170° C., thus under pressure to avoid boiling off of water present, and an acid or alkaline hydrolysis using an inorganic strong acid, such as hydrochloric acid, or sulphuric acid when an acid hydrolysis is concerned, whereas the pH is about 2 or lower, or using lime or other basic agent when a alkaline hydrolysis is concerned. Preferably, this treatment is carried out at a pH exceeding 10. Lime, $Ca(OH)_2$, CaO, or caustic hydroxide NaOH or other bases are added to a suitable pH. Thereby up to 50% of the COD-contents of the sludge be converted to a soluble form. The soluble form can, directly, or via a hydrolysis be used as a source of carbon, electron donar, in a denitrification process.

The sludge phase can be subject to biological hydrolysis in order to increase the yield. Biological hydrolysis can also be a pretreatment step. In chemical decomposition of a sewage water sludge precipitated by an aluminium based precipitation agent the aluminium compound can be redissolved at high pH-values as an aluminate and be re-used for reduction of phosphorous at an after-denitrification. Thereby the aluminium salt ought to be combined with an iron compound at the pre-precipitation, which iron salt binds the phosphorous as the iron phosphate compound can not be redissolved. The precipitation/coagulating chemicals from the chemical precipitation step, i.e., aluminium, and iron, will also become dissolved during an acid hydrolysis and will thus be recovered. Thereby half the amount of coagulating chemicals can be re-used.

Most preferably the treatment of the biological sludge is carried at a temperature of 150° C. at a pressure of about 6 bars absolute pressure during less than 1 hr. The reject water obtained following a subsequent acid hydrolysis at pH 1 is an excellent source of carbon equivalent to methanol and starch. The residual contents after hydrolysis will readily precipitate like ashes.

The present method also provides excellent precipitation characteristics in the following steps.

At a pre-denitrification the source of carbon obtained can be used in combination with the easily available organic substance remaining in the sewage water.

The source of carbon produced in accordance with the present process can also be added to the return sludge before being returned to the bioprocess. Thereby the high concentration of active sludge is utilized.

I claim:

1. A process for the purification of sewage water comprising:
   (a) carrying out a chemical precipitation of the sewage water using aluminum salts, calcium salts, iron salts or combinations thereof to obtain a sludge, and thereafter pre-treating the sludge mechanically, enzymatically, thermally, biologically, chemically or combinations thereof to increase the availability of the pre-treated sludge to bacterial oxidation; and
   (b) subjecting the sewage water treated in step (a) to a nitrification step wherein ammonium nitrogen contained therein is oxidized to nitrate, and a denitrification step wherein nitrates contained therein are reduced to nitrogen gas, the denitrification step comprising admixing the pre-treated sludge or a solution of pre-treated sludge and additional sewage water to the sewage water undergoing denitrification, with the pre-treated sludge or solution thereof acting as a source of carbon in the denitrification step, and decomposition of the pre-treated sludge occurring simultaneously with the denitrification step.

2. A process according to claim 1, wherein the sludge is pre-treated chemically by hydrolysis or decomposition after a biological hydrolysis.

3. A process according to claim 2, wherein the sludge is pre-treated thermally at a temperature of between 100-170 C. for 1 hour during simultaneous acid or alkaline hydrolysis.

4. A process according to claim 3, wherein the acid hydrolysis takes place using an inorganic acid, selected from the group consisting of hydrochloric acid and sulphuric acid, at a pH of less than 2.

5. A process according to claim 3, wherein the hydrolysis takes place using an alkaline hydrolysis by adding an alkaline agent selected from the group consisting of lime, $Ca(OH)_2$, CaO, and NaOH at a pH of at least 10.

6. A process according to claim 5, wherein $Ca(OH)_2$ or NaOH are added to a desired pH.

7. A process according to claim 6, wherein a mixed salt of aluminium and iron or aluminium only is redissolved as an aluminate and is reused at an after-denitrification process in order to obtain a simultaneous precipitation of phosphorous.

* * * * *